United States Patent [19]

Stalling et al.

[11] Patent Number: 5,384,023
[45] Date of Patent: Jan. 24, 1995

[54] SOLVENT EXTRACTION METHOD AND APPARATUS FOR RECOVERING ANALYTES

[75] Inventors: David L. Stalling; Thomas S. Wood; Kevin P. Kelly, all of Columbia; Leemer G. Cernohlavek, Fulton; Philip D. Lochhaas, Columbia; Loren C. Schrier, Hallsville; David M. Strumpf, Columbia, all of Mo.

[73] Assignee: Analytical Bio-Chemistry Laboratories, Inc., Columbia, Mo.

[21] Appl. No.: 72,021

[22] Filed: Jun. 7, 1993

[51] Int. Cl.$^6$ .......................... B01D 17/06; B03C 5/00
[52] U.S. Cl. .................... 204/186; 204/190; 204/191
[58] Field of Search .................... 204/186, 190, 191

[56] References Cited

U.S. PATENT DOCUMENTS

| | | | |
|---|---|---|---|
| 4,204,934 | 5/1980 | Warren et al. | 204/186 |
| 4,606,801 | 8/1986 | Prestridge et al. | 204/186 |
| 4,747,921 | 5/1988 | Bailes et al. | 204/186 |
| 4,767,515 | 8/1988 | Scott et al. | 204/186 |
| 4,941,959 | 7/1990 | Scott | 204/186 |
| 5,122,360 | 6/1992 | Harris et al. | 423/592 |
| 5,262,027 | 11/1993 | Scott | 204/186 |

*Primary Examiner*—John Niebling
*Assistant Examiner*—Arun S. Phasge

[57] ABSTRACT

An improved liquid/liquid solvent extraction method and apparatus utilizes an external electrode for creating an electric field within an extraction cell to shatter aqueous sample droplets flowing within a non-conductive solvent. The external electrode is in intimate contact with the exterior surface of the insulative cell wall so as to preclude direct electrical contact between the electrode and the internal liquids. A sample interface detector permits the interface between the two liquids to be detected when the liquids sequentially flow out from the cell, thereby facilitating separate collection of the liquid. Interface detection is achieved by coupling electrical pulses into the flowing liquid to cause ionization charge/discharge cycles in the conductive aqueous sample but not in the non-conductive solvent. Downstream detection of the charge/discharge cycle in the liquid identifies the interface.

20 Claims, 5 Drawing Sheets

SOLVENT EXTRACTION METHOD AND APPARATUS FOR RECOVERING ANALYTES

BACKGROUND OF THE INVENTION

1. Technical Field

The present invention pertains to methods and apparatus for performing solvent extraction under the control of electrical fields. In particular, the invention pertains to an improved liquid/liquid extraction process and extraction cell structure.

2. Discussion of the Prior Art

The invention described herein is an improvement of the method and system disclosed in U.S. Pat. No. 4,767,515 (Scott et al). The disclosure in that patent is expressly incorporated herein in its entirety.

It is well known in the prior art to extract trace analytes and the like from liquid samples by dispersing the samples in a solvent liquid. Traditional methods for such liquid/liquid extraction of most environmental samples are both labor and solvent intensive, and have high potential for exposure of laboratory workers to solvents and other hazardous substances. Various alternatives, such as solid-phase extraction cartridges or disks, may not satisfactorily cope with difficult aqueous matrices. Improvement of ordinary liquid/liquid extraction techniques, by automating fluid transfers and using electrically enhanced mass transfer, provides opportunity for superior analyte recoveries and more consistent analytical results while reducing solvent and energy consumption and decreasing personnel exposure hazards. An example of a system employing electrically enhanced mass transfer is found in the above-referenced Scott et al patent wherein a method and system for solvent extraction is disclosed. Droplets of the sample are shattered by a high intensity electrical field within the solvent to form a plurality of smaller droplets having a greater combined surface area than the original droplets. The electric field is generated between spaced electrodes disposed within the substantially non-conductive solvent. Dispersion, coalescence and phase separation are accomplished in one vessel through the use of a single pulsing high intensity electrical field under conditions chosen so that simultaneous dispersion and coalescence take place in the emulsion formed in the field. The electrical field creates a large amount of interfacial surface area for solvent extraction when the droplet is disintegrated, and is capable of controlling droplet size and thus droplet stability. These process steps take place in the presence of a counter-current flow of continuous phase solvent. The efficiency of mass transfer during liquid-liquid extraction depends directly upon the amount of the surface area between the two immiscible liquids. Since the solvent (e.g., methylene chloride) is essentially non-conductive, the charged metal electrodes mounted within a solvent-containing region can polarize water droplets, leading to shape distortion, rotation, translation and rupture of the droplets. This greatly increases phase transfer kinetics for extraction of organic analytes from aqueous samples. Concurrently, the electrical field in another region of the cell promotes coalescence of the micron-sized aqueous droplets, thereby promoting phase separation.

In systems such as that disclosed in the Scott et al patent, the application of high voltage pulses to the internal electrodes results in an accumulation of electrical charge between the electrodes. If the number of aqueous solution particles or droplets dispersed between the electrodes becomes sufficiently large, high voltage arcing can occur via droplet "strings" or "chains" subsisting between the electrodes, particularly between the dispersion electrode and the grounded nozzle for injecting the aqueous sample into the solvent. Such arcing causes resistive heating and excessive current flow that could potentially degrade the solvent and dissolve analytes. More specifically, high energy arcing from the internal dispersion electrode is undesirable for a number of reasons. First, if there is any chance that the high voltages employed in the system could in any way change the analytes of interest, it is far more likely to occur as a result of the high energy arc. Second, the possibility of arcing leads directly to the need to detect such arcing and then to regulate or control the high voltage power supply driving the dispersion electrode; both of these functions are expensive and unnecessarily complex. Third, arcing also generates undesirable electrical noise, thereby limiting the utilization of the system for certain applications. It is therefore necessary to operate the electrodes at reduced voltages to avoid these problems, thereby severely limiting the versatility of the system. In addition to the arcing problem, internal electrodes require holes in the cell wall to provide electrical connections for the electrodes. These holes require seals about the connections and even then are subject to leakage. Moreover, space between the cell wall and internal electrodes tends to collect material that could contaminate future samples. Further, since the internal electrodes are in direct contact with the sample or solvent, they must be made of a material which does not in any way react with those liquids. The present invention addresses these problems.

In a system developed to overcome some of the problems described above, it was found convenient to flow extraction solvent and the aqueous sample sequentially out of the extraction cell via the same port at the bottom of the cell after solvent extraction has been completed; that is, the solvent is first caused to flow from the cell, followed by the less dense processed or extracted water layer. In order to permit the sample-carrying solvent to be collected separately from the processed water layer, it is therefore necessary to control a valve in a manner permitting separate collection of the two liquids. The present invention also addresses this problem.

OBJECTS AND SUMMARY OF THE INVENTION

It is therefore an object of the present invention to provide a method and apparatus for effecting liquid/liquid extraction of analytes utilizing high voltage electrical fields to effect sample liquid dispersion within a solvent without danger of high energy arcing.

It is another object of the present invention to provide a novel electrode configuration for a liquid/liquid extraction system of the type described.

A further object of the present invention is to provide a method and apparatus for accurately detecting an interface between sequentially flowing extraction solvent and sample liquid in the outflow from a liquid/liquid extraction cell.

In accordance with one aspect of the present invention, the problems caused by internal electrodes (i.e., electrodes immersed in the solvent inside the extraction cell) are eliminated by disposing the electrodes outside the insulative cell wall. The result is a change in the manner by which droplet dispersion is effected by the electrical pulses applied to the electrodes. With the external electrodes of the present invention, dispersion is caused by the induced charge and discharge current flowing between the grounded input nozzle and the external electrode. More particularly, a capacitive effect is produced whereby dispersion results from the induced charges flowing as a result of the electrical field rather than from any direct electrical current flow.

The use of external electrodes brings about several advantages. For example, there is absolutely no possibility of high energy arcing through the active cell area, solvent or aqueous sample. In addition, no electrodes are required inside the cell, thereby eliminating holes that would otherwise be required to connect leads to internal electrodes, and no seals are required around such holes. External electrodes eliminate the void volume between the internal electrodes and the cell wall, thereby eliminating a source of sample-to-sample cross-contamination. Since external electrodes never contact the solvent or the sample, they can be made from any convenient moderately conductive material. Additionally, since there is no chance of high energy arcing, the pulsed high voltage power supply can be operated with a much lower energy load.

Control of sequential flow of the solvent and aqueous sample out from the cell is effected by a sample interface detector. This detector includes a transmission coil disposed about the cell outflow tube and arranged to inductively transmit a continuous stream of high frequency electrical pulses into the flowing liquid through the tube wall. A matched receiving coil is also disposed about the tube at a location slightly downstream from the transmission coil. When the liquid flowing in the tube is electrically conductive, the transmitted pulses cause an ionic charge/discharge pattern in the liquid; for non-conductive liquids, no such pattern results. The receiving coil is used to detect the charge/discharge pattern at the interface between the two flowing liquids. Circuitry responds to detection by the receiving coil of the charge/discharge pattern and provides a control signal to operate appropriate valving and other control apparatus.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
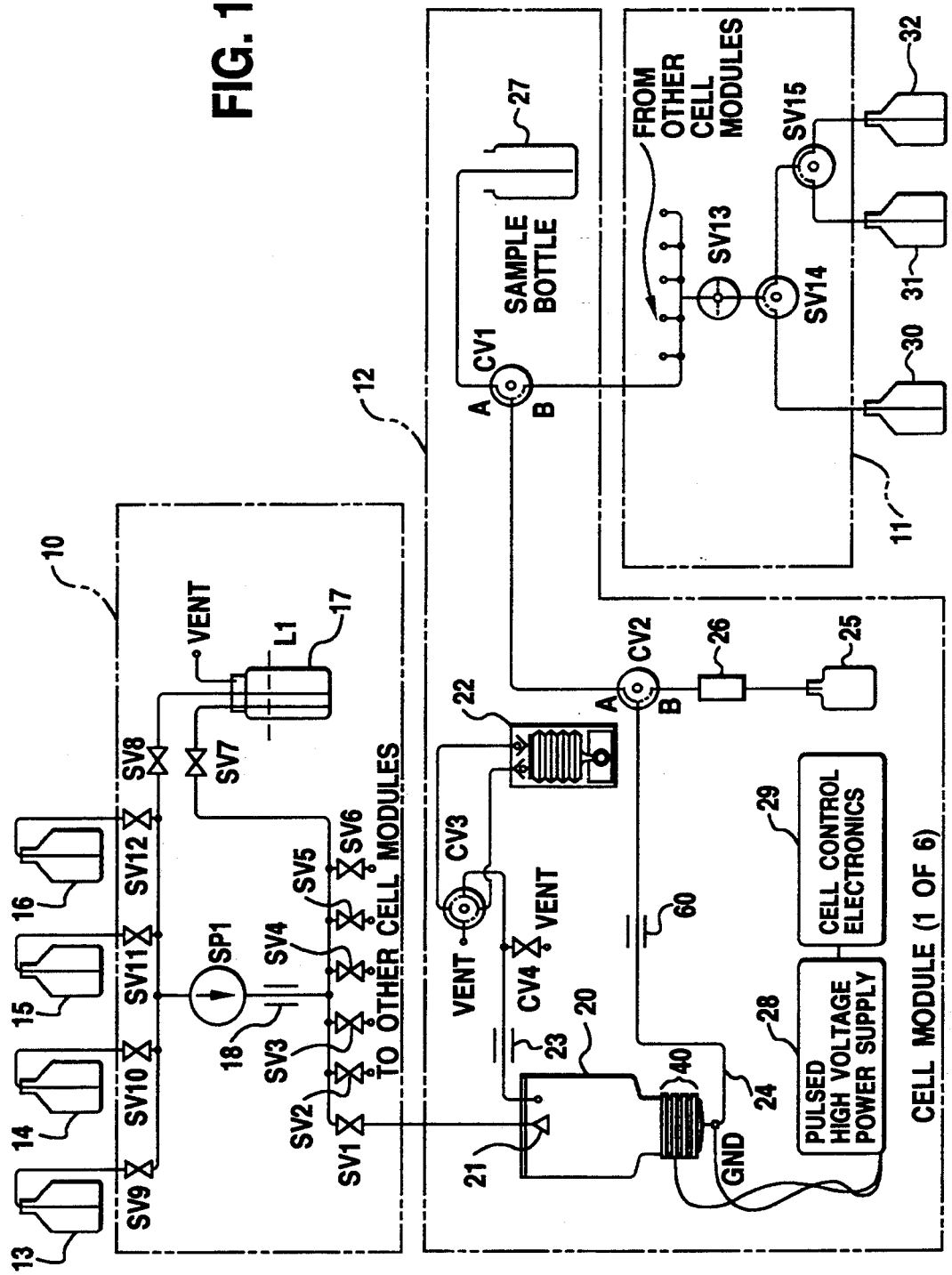
FIG. 1 is a schematic flow diagram of a system utilizing the improved extraction cell of the present invention.

The system illustrated schematically in FIG. 1 is an automated solvent extraction system capable of processing aqueous samples in a rapid and automatic sequence. It is to be understood, however, that the system may be operated manually, if desired, and that the present invention does not depend on the automated aspect of the system which is disclosed herein only as a preferred mode of operating the system utilizing the invention. The system includes a common solvent and rinse section 10, a common waste collection section 11 and a plurality (e.g., six) of substantially identical extraction cell modules 12, only one of which is shown in FIG. 1. The plural cell modules 12 perform extraction on respective samples simultaneously, that is, in parallel. The system is programmable by the user to perform various selected operations in desired sequences, it being understood that the programming capability is not part of the present invention and, therefore, is not described herein.

The solvent rinse and delivery section 10 includes a system pump SP1 having its input port connected to the output ports of four valves SV9, SV10, SV11 and SV12. Valve SV9 is controllable to selectively deliver detergent liquid to the pump SP1 from a container 13. Similarly, deionized water may be selectively delivered from a container 14 to the pump SP1 via valve SV10; a non-chlorinated organic solvent such as isopropyl alcohol may be selectively delivered from a container 15 to the pump via valve SV11; and methylene chloride or other suitable extraction solvent may be selectively delivered from the container 16 to the pump via valve SV12. Valves SV9, SV10, SV11 and SV12 are typically operated at different times in prescribed sequences to permit selective delivery of their controlled liquids by pump SP1 to the different cell modules 12.

The input port of valve SP1 is also connected to the output port of a valve SV8 having its input port connected to receive liquid from a measuring bottle 17. The output port of valve SP1 is capable of delivering liquid to bottle 17 via another valve SV7. A liquid level sensor L1 associated with bottle 17 permits measured amounts of liquid to be delivered to and subsequently withdrawn from the bottle by operating the valves in an appropriate sequence.

An air/liquid detector 18 is provided in the output flow path from pump SP1. Detection of air in this flow path permits automatic shut down of the pump.

The output port of pump SP1 is also connected to the input ports of each of valves SV1, SV2, SV3, SV4, SV5 and SV6. These valves are selectively operable to deliver liquid from the pump to respective load cell modules 12. In particular, at each load cell module 12 there is a load cell 20 having an input nozzle 21 at its upper end for spraying received liquid into the load cell. Nozzle 21 is directly connected to a respective valve SV1–SV6 dedicated to that cell module.

A reversible pumping arrangement for cell 20 includes a bellows pump 22 and a control valve CV3. In one position of valve CV3, pump 22 delivers air under pressure to the top of cell 20 to force liquid out of the cell bottom. In the other position of the valve, the pump exhausts air from the top of the cell, effectively drawing liquid into the cell bottom. A pressure sensor 23 is arranged to sense the pressure of the air at the top of the load cell as part of the control arrangement for valve CV3. A further valve CV4 is connected between the output line of valve CV3 and ambient to permit the line to be selectively exhausted.

Figure 4:
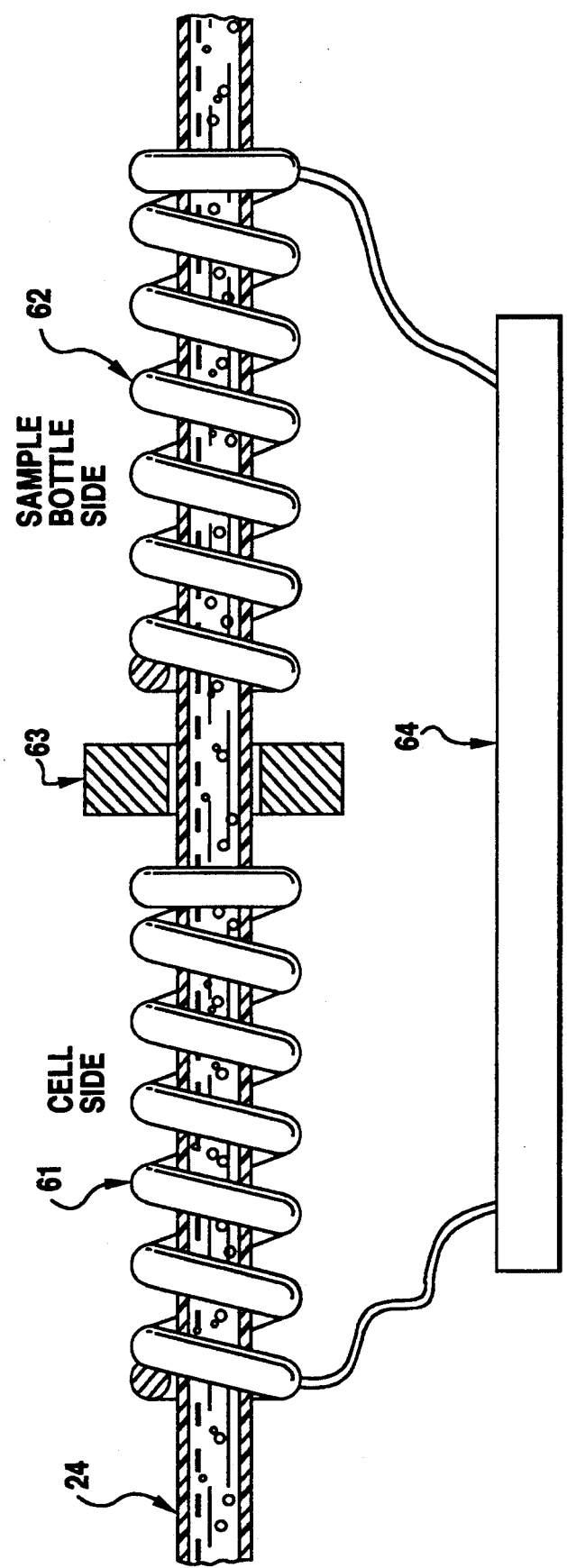
FIG. 4 is a diagrammatic illustration of the sample interface detector mounted on the outflow tube from the extraction cell.

At the bottom of load cell 20, a flow line 24 is connected to permit flow into and out of the cell. A sample interface detector 60 is disposed about flow line 24 and serves to detect the presence of electrically conductive aqueous sample liquid in the line, as distinguished from the non-conductive solvent liquid. Detector 60 is described in greater detail hereinbelow in relation to FIGS. 4, 5 and 6. Flow line 24 is connected to a common port at a valve CV2 in the cell module. This common port can be selectively connected by valve CV2 to the cell extracted sample bottle 25 through a drying cartridge 26. Alternatively, valve CV2 can selectively connect its common port to a common port of a further valve CV1, also disposed a part of the cell module. This common port can be selectively connected to the cell module aqueous sample bottle 27. Alternatively, the common port of valve CV1 may be connected to valve SV13 in the waste collection section 17 common to all cell modules.

The extraction cell 20 in each module is described in greater detail hereinbelow in relation to FIGS. 2 and 3; for present purposes it is sufficient to note that the cell has a smaller cross-section at its bottom than at its top, with a funnel-like transition disposed between the larger and smaller cross-sections. Electrodes 40 disposed about the narrow bottom of the cell are connected to a high voltage power supply 28 controlled by electronic circuitry 29, both part of the cell module. The electrodes generate the electrical field required within the cell to achieve extraction of analytes within the narrow bottom in the manner described below.

The system waste collection section 11 receives liquid from the control valves CV1 of all six modules in parallel at the inlet of a valve SV13. When actuated, that valve conducts the received liquid to a two-position valve SV14 capable of alternatively delivering liquid to a chlorinated solvent waste container 30 or to a further valve SV15. The latter is capable of delivering the liquid alternatively to an aqueous waste container 31 or a nonchlorinated solvent waste container 32.

In operation of the system illustrated in FIG. 1, if a program has been entered into the system computer (not shown), instructions are displayed regarding the steps to be taken in preparing the system for an extraction sequence. For example, the user may be offered the option of pre-rinsing the system flow path with methylene chloride (i.e., the extraction solvent), and then instructed on loading the individual cell modules 12 with the extract sample receiving bottles 25 and the larger aqueous sample bottles 27 containing the samples to be extracted. Upon completion of system set-up per programmed instructions, the user is prompted on starting the extraction sequence, at which time the previously programmed automated phase of the process is initiated. Again, it will be appreciated that the extraction sequence can be performed manually utilizing the principles of the present invention, if desired.

Automatic extraction sequences are carried out according to the user defined program. The program parameters include identification of cell modules to be used, the number of passes that the aqueous phase (i.e., sample) will make per aliquot of methylene chloride (i.e., extraction solvent), and whether one or two aliquot of solvent are to be used. A pass is defined as a completed circuit in which the aqueous sample is pumped through the extraction solvent, and thereafter the contents of the extraction cells 20 are emptied in order to initiate another pass or some other processing step as defined by the program. In this manner, a two-pass extraction sequence consists of pumping the aqueous sample through the solvent, returning the contents of the extraction cell 20 back to the aqueous sample bottle 27, and then repeating the process using the same charge of extraction solvent. A more detailed description of the extraction modes and general operation of the system are set forth in the next few paragraphs. Regardless of the specifics of the program, the extraction phase of the run involves several automated steps. Some of the steps are performed in a sequential manner, such as cleaning the extraction cells; others, such as sample extraction, are performed in a parallel manner to maximize sample throughput.

In the first step of the extraction sequence, specified extraction cells 20 are sequentially loaded with a small volume (e.g., 120 mL) of extraction solvent. After the last cell is loaded, a high voltage electric field is set up inside the narrow neck section of each cell by means of electrodes 40 and high voltage power supply 28. Delivery of the aqueous sample from each sample bottle 27 to each respective cell 20 is then initiated. Sample interface detector 60, pressure sensor 23 and liquid level sensor L1 oversee the process to ensure proper operation and provide the system with status feedback. The extraction process continues until the sample interface detector 60 senses complete introduction into cell 20 of the aqueous sample. At this point the extraction pass is completed and the electrical field is shut off. Based on the programming previously described, several options exist for the next step of the sequence. If more than one extraction pass is selected during programming, pumping via pump 22 and valve CV3 is reversed, whereby the solvent and aqueous sample are pumped back into the large volume (e.g., 1,250 mL) aqueous sample bottle 27. This step is completed when sample interface detector 60 senses the end of the aqueous phase passing back to the bottle. Forward pumping is then resumed, the solvent at the bottom of aqueous sample bottle 27 is pumped back to cell 20, the high voltage electric field is reestablished, and the aqueous phase is extracted again within cell 20. This sequence can be repeated up to five times with the same aliquot of solvent. Upon completion of the programmed number of passes, the solvent extract is collected in the extracted solvent bottle 25. The aqueous phase is either sent back to the large volume aqueous sample bottle 27 for storage or further processing, or is diverted to the aqueous waste container 31.

Upon completion of the programmed number of extraction passes, the solvent extract is collected in bottle 25 and the aqueous phase can be sent back to the large volume aqueous sample bottle 27. The entire multiple pass sequence can then be repeated using a fresh small volume aliquot of solvent. In this scheme, the aqueous phase is subjected to the same multiple pass extraction as was previously completed, except that a fresh 120 mL portion of extraction solvent is used, resulting in improved recoveries. This is useful for obtaining high recovery of more water soluble analytes. At the end of the second multiple extraction pass sequence, the solvent is again drawn off, and the second extract is combined with the previous solvent extract at container 25. The aqueous phase is conducted either to the aqueous waste container 31 or back to the aqueous sample bottle 27 for collection/disposal, depending upon the software option chosen.

After completion of the programmed extraction sequence, the extraction cell and the associated flow paths are rinsed in preparation for the next set of samples to be extracted. The sequence of the rinsing can be carried out utilizing up to four rinse solutions from containers 13, 14, 15 and 16. Rinsing is programmed by the user as part of the system set up procedure. Each of the four rinse steps can be repeated up to six times per extraction module. In all cases the extraction solvent comprises the final system rinse, and the rinsing is performed sequentially on the modules utilized during the extraction process. A generalized rinsing sequence is described in the following paragraph.

Immediately following the evacuation of the post-extraction aqueous phase, aqueous wash solution from container 13 is sprayed into the extraction cell and pumped from the cell toward the aqueous waste container 21. Then, likewise, deionized water rinse solution from container 14 is sprayed into the extraction cell and pumped toward the aqueous waste container. To remove any remaining aqueous rinse from the system, a third rinse solution from container 15, typically an organic solvent (such as isopropanol), miscible with water and the extraction solvent, is sprayed into the cell 20 and pumped toward non-chlorinated solvent waste container 32. After repetitive rinses to remove all remaining water, the final rinses are performed by spraying the extraction solvent into the system and pumping these aliquots to chlorinated solvent waste container 30. In the last rinse with the extraction solvent, approximately 10 mL of the solvent is drawn off and used to rinse the extract collection flow path between valve CV2 and extracted sample container 25. The aqueous sample input line between bottle 27 and valve CV2 is rinsed, and the remainder of the final extraction solvent rinse is pumped to chlorinated solvent waste container 30.

After rinsing is completed, the instrument is ready for the user to unload the system and prepare for the next set of samples. Unloading is performed by uncoupling the aqueous sample bottle 27 from the aqueous sample line, and removing the extract receiving bottle 25 from the system.

Figure 2:
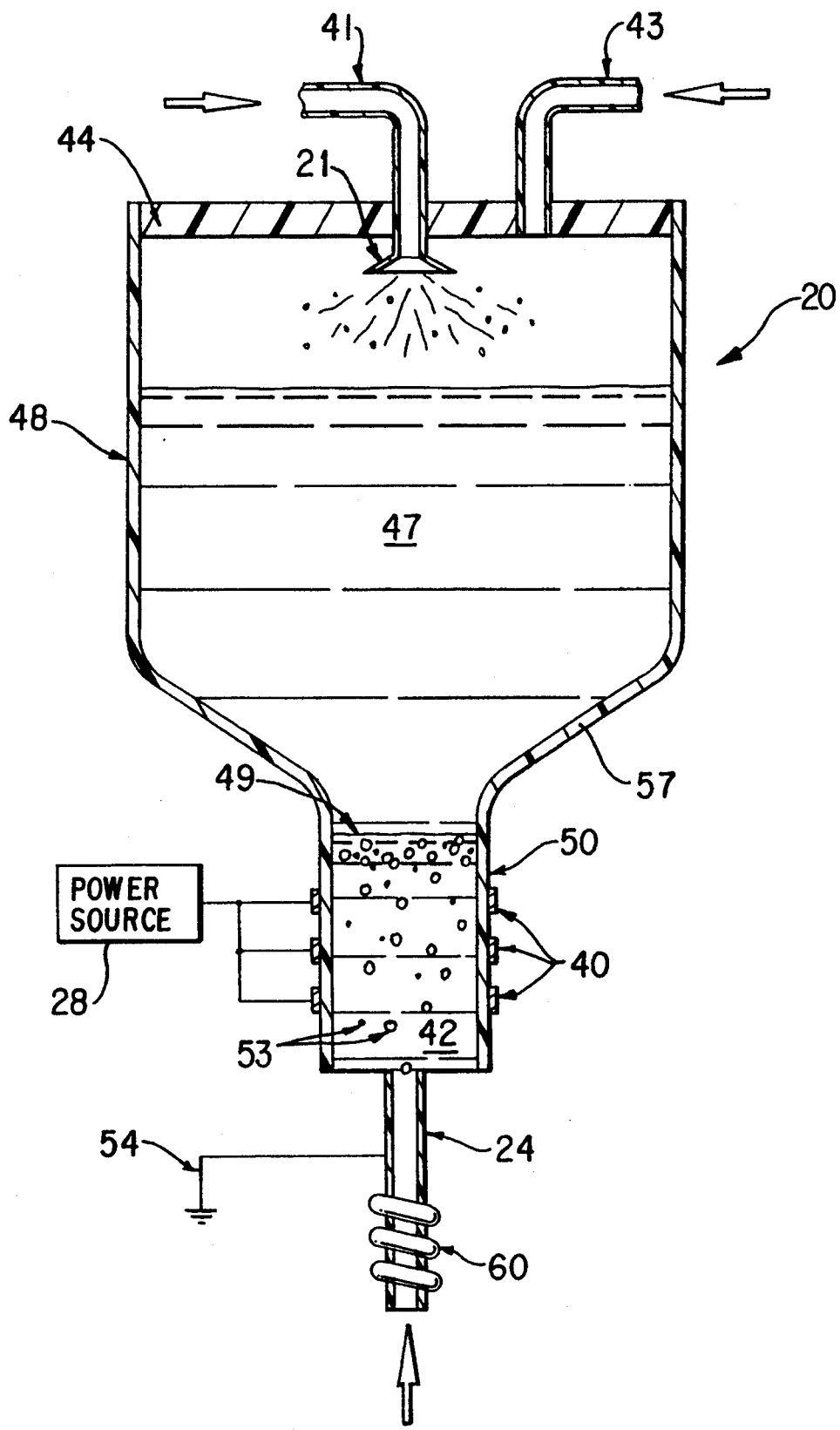
FIG. 2 is a sectional view in elevation and partially diagrammatic of an extraction cell constructed in accordance with the principles of the present invention.
Figure 3:
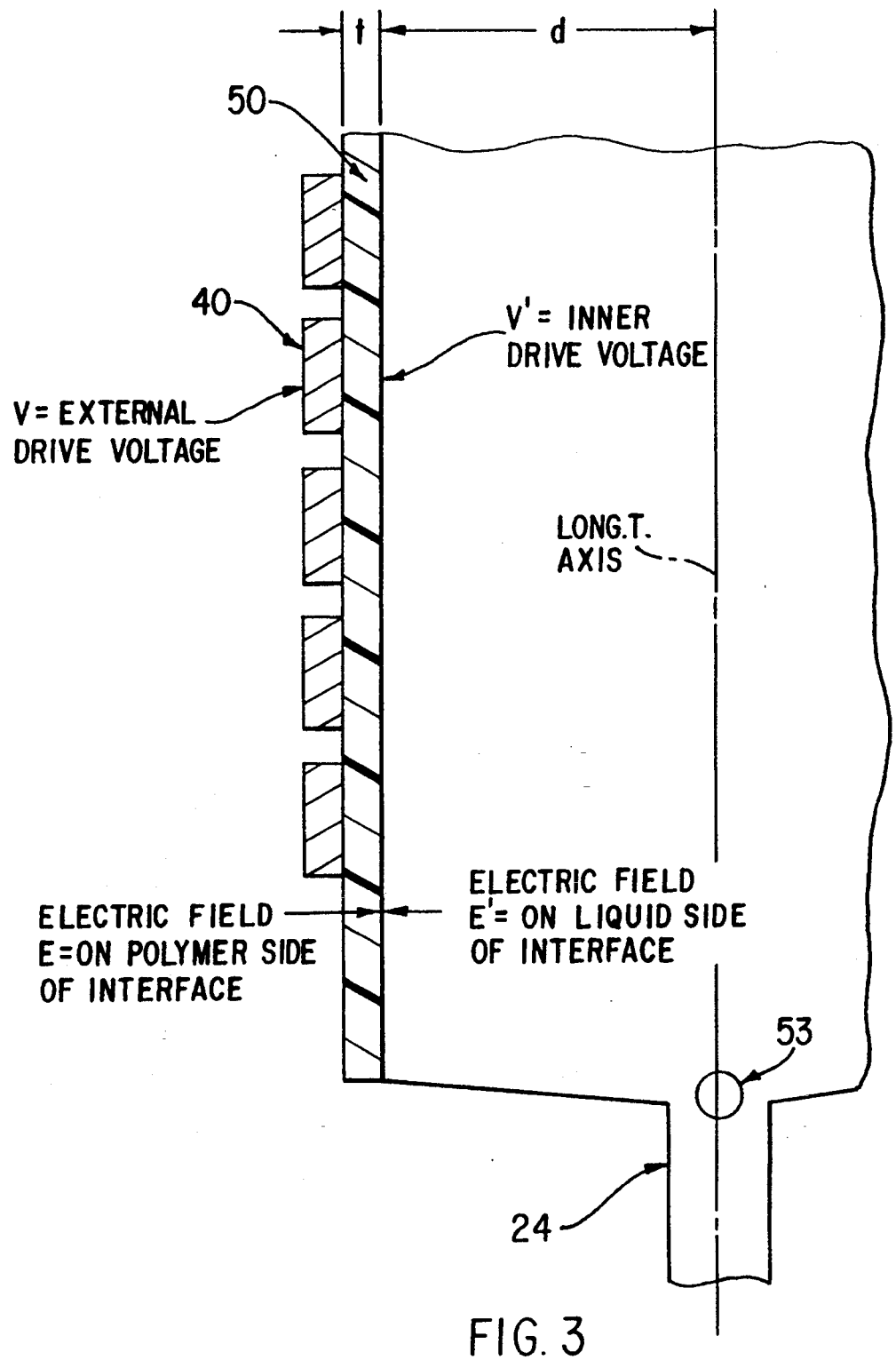
FIG. 3 is a detailed view in vertical section of a portion of the cell of FIG. 2.

Referring to FIGS. 2 and 3, an important aspect of the present invention relates to the structure and operation of the extraction cell 20. Specifically, cell 20 takes the form of an inverted bottle having a large diameter cylindrical upper section 48, a smaller diameter bottom neck section 50 and a smoothly tapered funnel section 57 serving as a transition between the upper and neck sections. The cell wall is preferably injection molded (or otherwise constructed) from Teflon (TM Dupont Company) or other solvent-resistant polymer having a high dielectric constant. The smaller diameter neck section 50 is where the electric field is applied, and its small size serves to minimize the volume of solvent utilized for extraction while maximizing the electrical dispersion field. It is to be noted that if a solvent less dense than water is used, the upper section 48 of the cell would be formed with a smaller diameter than the cell bottom. The diameter of the smaller diameter portion of the cell, the thickness of the cell wall, and the dielectric constant of the cell wall material are all chosen to achieve desired extraction operational characteristics. The diameter of the larger diameter section is designed to hold the total volume of sample and may differ for different applications. The cell wall is preferably transparent in order to permit observation of the action of the electrodes and the liquid content at various stages of the process.

The top of the cell is sealed with an insulative cap 44 having two openings. One opening receives the inlet tube 41 for liquid and is terminated inside the cell by spray nozzle 21. A second opening in the cap serves as a port for receiving an air flow tube 43 communicating with valve CV3 (FIG. 1). The cell wall is required to be sufficiently rigid to prevent collapse when the internal cell pressure is reduced by evacuation of air via tube 43 by the reversible pump. Spray nozzle 21 is designed to alternatively rinse the cell interior under high pressure or add measured amounts of extraction solvent under lower pressure.

Application of negative pressure to tube 43 is monitored by pressure sensor 23 (FIG. 1). Control of negative pressure within the cell permits the aqueous sample to be introduced into the cell through a bottom inlet flow passage 24 at a controlled rate (e.g., 50 mL/min.). The aqueous droplets 53 then rise through the immiscible solvent 42 disposed within the narrow cell neck section 50 and are immediately dispersed into smaller daughter droplets by the forces acting on them as a consequence of surface charges. That is, an electrical field is created from voltage induced on the inside surface of the cell wall by the application of high voltage pulses to external electrodes 40. The field then acts on the charged droplets in a manner similar to that described in the aforementioned Scott et al patent. In this regard, the metal cell inlet from flow line 24 is electrically grounded at 54 relative to electrodes 40. Accordingly, the inflowing aqueous sample and the emerging droplets 53 are initially at ground potential relative to the field established by the electrodes.

The key feature of the cell is the location of electrodes 40 outside, rather than inside, the cell. Although described and illustrated as multiple interconnected ring-shaped electrodes disposed about neck portion 50, a single solid ring electrode may be so disposed instead. However, plural ring electrodes, electrically interconnected to function as one electrode but spaced by axial distances comparable to their axial length, have been found to produce maximum dispersion of droplets 53 and appear to provide a non-uniform field in solvent 42, which field serves to disperse a wider range of charged particles.

Upon saturation of solvent 42 with the water from the aqueous sample, an interface 49 between the solvent and water 47 forms above the uppermost electrode ring near the top of neck portion 50. The location of the solvent-/water interface 49 with respect to the uppermost electrode ring is important in that a fringe field induced by that electrode ring interacts with droplets approaching the interface. In this regard, the bulk water 47 forms a conductive plane at the upper surface of interface 49. Thus, after mass transfer of analytes takes place in the lower region, the fringe field acts to coalesce the small water droplets into larger and larger droplets which ultimately aggregate and disperse in the bulk water accumulated in the upper fringe field above the uppermost electrode.

As best illustrated in FIG. 3, the external annular electrodes 40 are in direct contact with the outer surface of the wall portion forming neck section 50 of the cell. The dielectric constant must be large enough for the voltage on the external electrodes to induce a voltage in the solvent sufficiently high to propagate appropriate field strengths within the cell. Specifically, the induced field must create forces on the entering droplets at ground potential sufficient to cause oscillation of the droplets.

In order to understand appropriate voltage levels required to be applied to electrodes 40, the following will be helpful. Assume that, $\epsilon$ is defined as the dielectric constant of the cell wall material and t is the thickness of that wall. Further, E is the electric field strength on the inside surface of the cell wall (i.e., on the wall side of the liquid/wall interface) at a distance d from the central longitudinal axis of the cell. Still further $\epsilon'$ is the dielectric constant of the liquid in the neck portion 50, and E' is the electric field strength at the outer liquid boundary (i.e., on the liquid side of the liquid/wall interface). The voltage applied to the electrodes is V, and the voltage at the liquid/wall interface is V'. Clearly, $V=V'+Et$, and $V'=E'd$, and the interfacial boundary conditions require that $\epsilon E = \epsilon' E'$. Therefore, the decrease in the voltage across the cell wall is $V-V'=(\epsilon/\epsilon')E'd$.

By way of example, the preferred cell wall material is Teflon having a dielectric constant of approximately 2.1; a typical wall thickness for the cell is 0.050 inch or less; and the applied voltage is on the order of 25-30 kV. Electrodes 40 are typically made of copper or other metal or alloy suitable for use as electrodes.

The key advantage of using external electrodes 40 is that the extraction solvent 42 is electrically isolated from the high voltage applied to the electrodes by the cell wall. As a consequence, current flow, if any, through the solvent is non-existent and arcing in the sample is eliminated.

The liquid flow exiting from the cell via tube 24 initially contains solvent that may be diverted to the extract sample bottle 25 (FIG. 1) or returned along with the extracted aqueous sample to sample bottle 27 (FIG. 1) for multiple reprocessing steps. Alternatively, after the sample interface detector 60 senses the presence of water in the line, the solvent and water portions can be separated and only the water returned to sample bottle 27. Thereafter a new extraction cycle may be initiated by adding a measured volume of new solvent, via measuring bottle 17 (FIG. 1), to the cell through inlet 41, and reintroducing the water sample into the cell in the manner described above.

The sample interface detector 60 disposed about flow line 24 detects transitions in that line from flowing water to flowing solvent or air. The detector is illustrated in detail in FIGS. 4 and 5 to which specific reference is now made. Specifically, detector 60 provides a logic signal allowing the extraction solvent to be separated from the processed or extracted water layer: (1) as the cell is filled (solvent arrives first at the bottom entry point of the cell), allowing validation of the sample load function; and (2) after the extraction sequence as the solvent leaves the cell, allowing valve CV2 (FIG. 1) to separate the two phases, placing the water in the sample bottle 27 and the solvent in the extract bottle 25.

The sample interface detector 60 includes a transmission coil 61 helically wound about the flow line 24. A receiver coil 62 is similarly wound about flow line 24 at a location slightly spaced from the transmission coil and more remote from the cell. An electrically insulative annular spacer 63 is disposed about flow line 24 between the two coils 61 and 62. A circuit board 64 is electrically connected to the coils.

Figure 5:
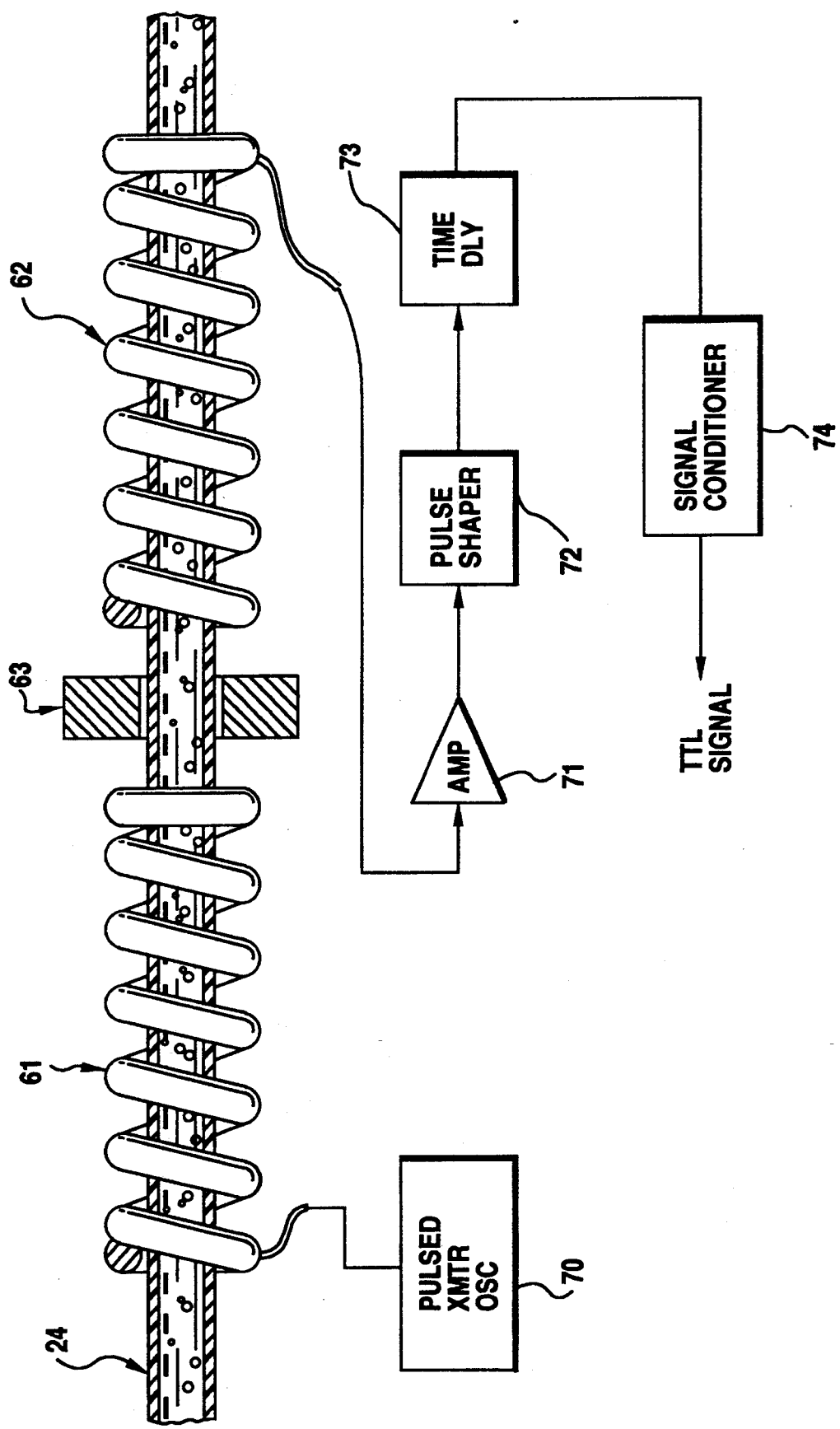
FIG. 5 is an electrical block diagram of the sample interface detector circuitry.

Referring more specifically to FIG. 5, the circuitry on the circuit board includes an oscillator 70 connected to apply a series of pulses to transmission coil 61. In a preferred embodiment, the pulses have an amplitude of 12 volts and a repetition rate of 25 KHz. The pulses are capacitively coupled through the tubing wall to the fluid, causing an ionic charge/discharge pattern in any electrically conductive fluid within the tubing.

The receiver coil 62 is connected to a receiver pulse amplifier 71 driving a pulse shaper 72. Amplifier 71 is typically a Schmitt trigger; pulse shaper 72 is used to account for the wide range of conductivity of different samples. The resulting pulses are filtered in a time delay circuit 73 to allow for inconsistent presence of sample due to air bubbles or trapped solvent bubbles in the flow line 24. The signal is then passed to a signal conditioning circuit 74 to condition the signal for TTL capability. The ionic charge/discharge pattern produced in conductive fluid is sensed as a series of voltage changes by the receiver coil. The pulses are amplified, shaped and conditioned to produce appropriate indications that conductive fluid has been sensed.

Cell 20 is illustrated in the preferred embodiment as having a large diameter upper cylindrical section, a smaller diameter lower cylindrical neck section, and a frusto-conical funnel serving as a transition between these sections. Such a configuration is convenient and simple to manufacture; however, it should not be construed as limiting the scope of the present invention. For example, the upper and lower sections may be polygonal, elliptical or irregular in transverse cross-section, and the transition portion can be appropriately configured to match. Under such circumstances the electrodes would be configured to match the contour of the outer wall surface of the smaller section so as to be in intimate contact therewith.

As described in the aforementioned Scott et al patent, the repetition rate of the high voltage pulses is preferably substantially the same as the natural oscillation frequency of the droplets to be dispersed, thereby facilitating dispersion. The strength of the electrical field through which the droplets flow is preferably greater than 1 kV/cm, but in any event is sufficient to stress the droplets and cause them to elongate and eventually shatter into daughter droplets. From this it will be appreciated that proper selection of the pulse repetition rate reduces the electric field strength requirements.

From the foregoing description it will be appreciated that the invention makes available a novel liquid/liquid extraction system having a number of advantages over prior systems. The external electrode approach utilizes an electric field generated by an array of annular metallic electrodes disposed about the cell body and pulsed at high voltage relative to the grounded aqueous sample input port. The aqueous sample is pumped into the solvent in the bottom of the chamber where the dispersive electric field and the translation/coalescence electrical fields promote phase transfer of organic analytes as in the system disclosed in the previously described Scott et al patent. The extraction solvent is in equilibrium with only a small portion of the aqueous sample at any given point in time, thereby contributing to excellent extraction efficiencies by minimizing the aqueous volume component of the partition. Importantly, the dispersion is caused only by the induced charge and the discharge current flowing between the grounded input port and the external electrode "capacitor" (i.e., dispersion is produced by the induced charges that flow as a result of the electric field, rather than from any direct electrical current flow). Under such circumstances there is absolutely no possibility of high energy arcs through the active cell area, solvent or aqueous sample. Since no electrodes are required inside the cell, there are no holes required through the cell wall to connect to internal electrodes, and no seals are required about the holes. Since there is no internal electrode, there is no void volume between an internal electrode and the cell wall, thereby eliminating the possibility of agglomeration of sample and/or solvent that could contribute to sample-to-sample cross-contamination. Moreover, the external electrodes never contact the solvent or sample and can therefore be made of any convenient moderately conductive material. With no possibility of high energy arcing, the high voltage power supply is operable with a much lower energy load; in fact, a discharge resistor of fifty to one hundred megohms is required to drain off the electrode voltage in achieving the desired voltage waveform.

As described herein, the individual electrodes shown in FIGS. 2 and 3 are electrically connected in parallel, effectively providing a "single" functional electrode from an electrical point of view. This single electrode creates a diminishing electrical field due to edge effects, thereby assisting coalescence of the droplets back into a contiguous liquid as described herein. The result is the elimination of the additional "channel electrode" utilized in the prior art to achieve droplet coalescence. Connection of the electrodes in parallel may be effected by wiring or structure. In the latter case, the annular electrode elements may, for example, be joined as annular ribs to a common vertically extending "spine" formed integrally with the annular ribs. This construction is not limiting on the scope of the invention, however.

The sample interface detector of the present invention provides a simple but effective technique for determining when one phase or the other has been pumped into or out from the extraction cell, thereby permitting automatic control of valves to redirect the subsequently flowing phase.

Having described preferred embodiments of the improved solvent extraction method and apparatus for recovering analytes according to the present invention, it is believed that other modifications, variations and changes will be suggested to those skilled in the art in view of the teachings set forth herein. Accordingly, it is to be understood that all such variations, modifications and changes are believed to fall within the scope of the present invention as defined by the appended claims.

What is claimed is:

1. A method of solvent extraction conducted in an extraction cell, said method comprising the steps of:
   (a) introducing droplets of a dispersed phase into a continuous phase disposed in said extraction cell, said droplets having a first surface area, said droplets being caused to flow through said continuous phase;
   (b) applying to said introduced droplets within said continuous phase a constant pulsed electric field of sufficiently high intensity to shatter said droplets into many smaller droplets to form an emulsion of said smaller droplets in said continuous phase, said smaller droplets having a combined total surface area greater than the total surface area of said introduced droplets;
   (c) coalescing a plurality of said smaller droplets to reform larger droplets; and
   (d) separating said reformed droplets from said emulsion to form a separate phase of the dispersed materials;
   wherein step (b) includes creating said electric field from outside said extraction cell with a voltage electrode disposed outside said extraction cell so as to be separated from said continuous phase and preclude any direct contact between said electrode and said continuous phase.

2. The method of claim 1 wherein step (a) comprises introducing droplets of an aqueous solution as said first phase into a substantially electrically non-conductive solvent as said second phase, said aqueous solution including analytes to be separated therefrom, said method further comprising the step of transferring said analytes from the reformed droplets to said solvent.

3. The method of claim 2 wherein said aqueous solution is less dense than said solvent, and wherein step (c) includes flowing said droplets upwardly through said solvent and through said electric field.

4. The method of claim 3 wherein step (d) comprises forming said separate phase of the dispersed material at a location above said solvent.

5. The method of claim 1 wherein step (b) includes the steps of:
   disposing said high voltage electrode as a plurality of annular electrodes about an electrically non-conducting wall of an extraction cell containing said first phase;
   electrically interconnecting said plurality of annular electrodes; and
   applying repetitive high voltage pulses to said electrodes.

6. The method of claim 5 further comprising the step of providing said extraction cell and performing steps (a), (b), (c), and (d) therein, said step of providing said extraction cell comprising molding a container of polymer material having a first section of with a predetermined cross-section, a second section of relatively smaller cross-section, and a transition section disposed between said first and second sections;
   wherein said step of disposing a plurality of electrodes includes disposing said electrodes about said second section in intimate contact with the outer surface of said extraction cell.

7. The method of claim 11 wherein said second phase is a liquid, said first phase is a liquid, and said second phase is less dense than said first phase, said method further comprising the step of orienting said extraction cell with said first section disposed above said second section, and wherein step (a) includes introducing said droplets into the bottom of said extraction cell and flowing the droplets upwardly through said second section.

8. The method of claim 7 wherein step (d) comprises forming said separate phase of the dispersed material at a location above said solvent.

9. The method of claim 5 wherein said annular electrodes have predetermined axial lengths, and wherein said step of disposing includes spacing successive electrodes by axial distances substantially corresponding to said axial lengths to provide said electric filed as a non-uniform field in said continuous phase.

10. The method of claim 1 wherein step (a) includes introducing said droplets via a nozzle disposed in said continuous phase;

wherein step (b) includes establishing said electric field between said electrode and said nozzle to create a capacitive effect producing electric charge transfer between said electrode and said nozzle.

11. The method of claim 1 wherein step (a) includes causing said dispersed phase droplets to flow in a generally axial direction through said continuous phase, and wherein step (b) includes the step of creating said electric field circumferentially about said extraction cell from a plurality of axially spaced locations outside said cell.

12. The method of claim 11 wherein said axially spaced locations have predetermined axial lengths and are axially spaced by distances substantially equal to said axial lengths.

13. A method for solvent extraction comprising the steps of:
   (a) introducing droplets of a dispersed phase into a continuous phase, said droplets having a first surface area, said droplets being caused to flow through said continuous phase;
   (b) applying to said introduced droplets within said continuous phase a constant pulsed electric field of sufficiently high intensity to shatter said droplets into many smaller droplets to form an emulsion of said smaller droplets in said continuous phase, said smaller droplets having combined total surface area greater than the total surface area of said introduced droplets;
   (c) coalescing a plurality of said smaller droplets to reform larger droplets; and
   (d) separating said reformed droplets from said emulsion to form a separate phase of the dispersed materials;
   wherein step (b) includes creating said electric field with an electrode disposed outside said continuous phase so as to preclude any direct contact between said electrode and said continuous phase;
   wherein step (a) comprises introducing droplets of an aqueous solution as said first phase into a substantially electrically non-conductive solvent as said second phase, said aqueous solution including analytes to be separated therefrom, said method darter comprising the step of transferring said analytes from the reformed droplets to said solvent;
   wherein said aqueous solution is less dense than said solvent, and wherein step (c) includes flowing said droplets upwardly through said solvent and through said electric field;
   wherein step (d) comprises forming said separate phase of the dispersed material at a location above said solvent; and
   further comprising the step of separately collecting said emulsion and said separate phase by flowing the emulsion and said separate phase sequentially through a first flow path while detecting the transition between said emulsion and said separate phase in said first flow path to permit directing of said separate phase to a second flow path.

14. The method of claim 13 wherein the step of detecting includes the steps of:
   generating a cyclical electric field in liquid flowing through a predetermined location in said first flow path to create a repetitive charge/discharge cycle in said electrically conductive separate phase when passing that location but creating no charge/discharge cycle in the electrically non-conductive emulsion passing that location; and
   at a second location slightly downstream of said predetermined location, sensing the presence of said charge/discharge cycle in fluid passing the second location.

15. The method of claim 13 wherein stop (a) includes introducing said droplets via a nozzle disposed in said solvent;
   wherein step (b) includes establishing said electric field between said electrode and said nozzle to create a capacitive effect producing electric charge transfer between said electrode and said nozzle.

16. A method for solvent extraction comprising the steps of:
   (a) introducing droplets of a dispersed phase into a continuous phase, said droplets having a first surface area, said droplets having caused to flow through said continuous phase;
   (b) applying to said introduced droplets within said continuous phase a constant pulsed electric field of sufficiently high intensity to shatter said droplets into many smaller droplets to form an emulsion of said smaller droplets in said continuous phase, said smaller droplets having a combined total surface area greater than the total surface area of said introduced droplets;
   (c) coalescing a plurality of said smaller droplets to reform larger droplets; and
   (d) separating said reformed droplets from said emulsion to form a separate phase of the dispersed materials;
   wherein step (b) includes creating said electric field with an electrode disposed outside said continuous phase so as to preclude any direct contact between said electrode and said continuous phase;
   wherein stop (b) includes the steps of:
      disposing said electrode as a plurality of annular electrodes about an electrically non-conducting wall of an extraction cell containing said first phase;
      electrically interconnecting said plurality of annular electrodes; and
      applying repetitive high voltage pulses to said electrodes;
   and further comprising the step of providing said extraction cell and performing steps (a), (b), (c), and (d) therein, said step of providing said extraction cell comprising molding a container of polymer material having a first section of with a predetermined cross-section, a second section of relatively smaller cross-section, and transition section disposed between said first and second sections;
   wherein said step of disposing a plurality of electrodes includes disposing said electrodes about said second section in intimate contact with the outer surface of said extraction cell;
   wherein said second phase is a liquid, said first phase is a liquid, and said second phase is less dense than said first phase, said method further comprising the step of orienting said extraction cell with said first section disposed above said second section, and wherein step (a) includes introducing said droplets into the bottom of said extraction cell and flowing the droplets upwardly through said second section;
   wherein step (d) comprises forming said separate phase of the dispersed material at a location above said solvent;
   and further comprising the step of separately collecting said emulsion and said separate phase by flowing the emulsion and said separate phase sequentially through a first flow path while detecting the transition between said emulsion and said separate phase in said first flow path to permit directing said separate phase to a second flow path.

17. The method of claim 16 wherein the step of detecting includes the steps of:
generating a cyclical electric field in liquid flowing through a predetermined location in said first flow path to create a repetitive charge/discharge cycle in said electrically conductive separate phase when passing said predetermined location by creating no charge/discharge cycle in the electrically non-conductive emulsion passing said predetermined location; and
at a second location slightly downstream of said predetermined location, sensing the presence of said charge/discharge cycle in fluid passing the second location.

18. A method for solvent extraction comprising the steps of:
(a) introducing droplets of a dispersed phase into a solvent in an extraction cell, said droplets having a first surface area, said droplets being caused to flow in a generally axial direction through said solvent;
(b) applying to said introduced droplets within said solvent a constant pulsed electric field of sufficiently high intensity to shatter said droplets into many smaller droplets and form an emulsion of said smaller droplets in said solvent, said smaller droplets having a combined total surface area greater than the total surface area of said introduced droplets;
(c) coalescing a plurality of said smaller droplets to reform larger droplets; and
(d) separating said reformed droplets from said emulsion to form a separate phase of the dispersed materials;
wherein step (b) includes creating said electric field from outside said extraction cell with an electrode disposed about the outside surface of an electrically insulative wall of said cell so as to preclude any direct contact between said electrode and said solvent.

19. The method of claim 18 wherein step (b) includes applying said electric field as a non-uniform field by disposing said electrode as plural axially spaced electrodes about said outside surface of said cell wall.

20. The method of claim 19 wherein said plural axially spaced electrodes have predetermined axial lengths, and wherein step (b) includes axially spacing successive electrodes by distances substantially corresponding to said axial lengths.

* * * * *